United States Patent
Ryu

(10) Patent No.: US 8,565,493 B2
(45) Date of Patent: Oct. 22, 2013

(54) METHOD, SYSTEM, AND COMPUTER-READABLE RECORDING MEDIUM FOR RECOGNIZING FACE OF PERSON INCLUDED IN DIGITAL DATA BY USING FEATURE DATA

(75) Inventor: Jung-hee Ryu, Seoul (KR)

(73) Assignee: Intel Corporation, Santa Clara, CA (US)

( * ) Notice: Subject to any disclaimer, the term of this patent is extended or adjusted under 35 U.S.C. 154(b) by 984 days.

(21) Appl. No.: 12/289,719

(22) Filed: Nov. 3, 2008

(65) Prior Publication Data

US 2009/0141950 A1    Jun. 4, 2009

(30) Foreign Application Priority Data

Nov. 5, 2007    (KR) .................. 10-2007-0112389

(51) Int. Cl.
*G06K 9/00*    (2006.01)

(52) U.S. Cl.
USPC .......................................... 382/115; 382/118

(58) Field of Classification Search
USPC .......................................... 382/118
See application file for complete search history.

(56) References Cited

U.S. PATENT DOCUMENTS

| | | | | |
|---|---|---|---|---|
| 6,038,333 | A * | 3/2000 | Wang | 382/118 |
| 7,239,726 | B2 * | 7/2007 | Li | 382/118 |
| 7,330,570 | B2 * | 2/2008 | Sogo et al. | 382/115 |
| 8,031,914 | B2 * | 10/2011 | Zhang | 382/118 |
| 2009/0322866 | A1 * | 12/2009 | Stotz et al. | 348/77 |

FOREIGN PATENT DOCUMENTS

| | | |
|---|---|---|
| KR | 2000-0054824 | 9/2000 |
| KR | 2006-0057110 | 5/2006 |

\* cited by examiner

*Primary Examiner* — Chan S Park
*Assistant Examiner* — Ha Le
(74) *Attorney, Agent, or Firm* — Blakely, Sokoloff, Taylor & Zafman LLP

(57) ABSTRACT

A face recognition method includes the step of: receiving feature data acquired by detecting each part of a face of a person included in digital data from a terminal at a server; comparing the feature data received from the terminal with those of persons determined as accessible among all feature data recorded in a feature data database based on face recognition technology, and deciding top n persons with top n degree of similarities among all persons recorded in the feature data database at the server, wherein the feature data recorded in the feature data database include feature data of each part of faces of the persons; and providing the information on the top n persons to the terminal. It may reduce work capacity and processing time by extracting and transmitting to the server feature data of each part of the face such as eyes, nose, mouth, ears and jaws.

19 Claims, 3 Drawing Sheets

| USER ID | EYE | MOUTH | •••• | NOSE | LIST OF FRIENDS |
|---|---|---|---|---|---|
| ⋮ | ⋮ | ⋮ | ⋮ | ⋮ | ⋮ |
| DONGLE |   |   | •••• |   | TOM |
| ⋮ | ⋮ | ⋮ | •••• | ⋮ | ⋮ |
| TOM |   |   | •••• |  | DONGLE ; JANE |
| ⋮ | ⋮ | ⋮ | | ⋮ | ⋮ |

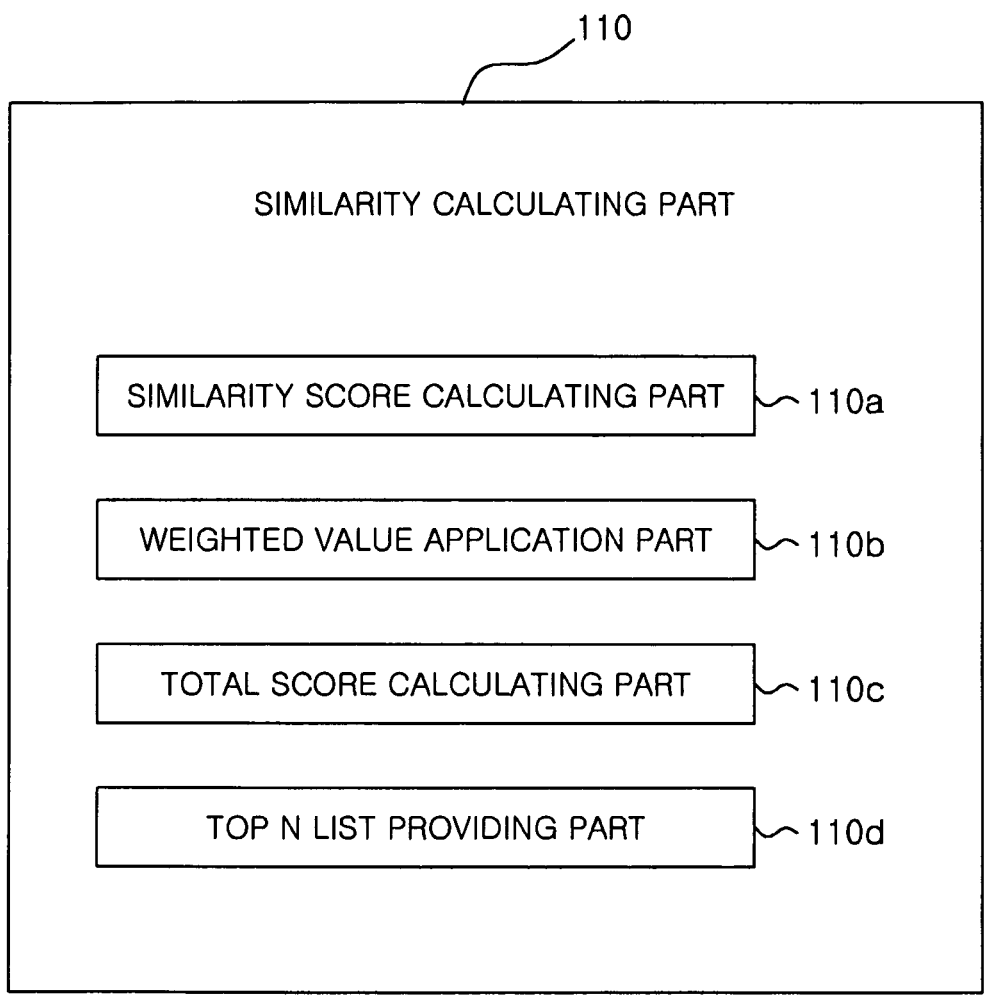

METHOD, SYSTEM, AND COMPUTER-READABLE RECORDING MEDIUM FOR RECOGNIZING FACE OF PERSON INCLUDED IN DIGITAL DATA BY USING FEATURE DATA

FIELD OF THE INVENTION

The present invention relates to a method and a system for recognizing a face of a person included in digital data by using feature data; and more particularly, to the method and the system for improving a face recognition rate by detecting each part of the face included in the digital data and then comparing the feature data of the face with those of already recorded persons.

BACKGROUND OF THE INVENTION

Recently thanks to the wide spread of digital apparatuses exclusively for photography such as video cameras and digital video recorders as well as camera-imbedded mobile terminals and mp3 players, the number of users who create digital data such as videos has sharply increased.

Accordingly, the amount of digital data created has drastically increased as well and this has requested the necessity to build a system which may systematically manage and use-enormous amount of data.

To perform the management of the digital data and make users use such data more easily, technologies for granting a tag to the digital data by recognizing a person in the digital data were suggested and a variety of methods which extract a tag from the digital data with a higher accuracy are attempted. Herein, "a tag" may be understood as additional data attached to the digital data for rapid access or search to data and it is generally composed of a series of characters or numbers, or a combination of characters and numbers.

As such, it would be possible to attach a tag (i.e., a person tag) inclusive of the information on the recognized persons in the digital data, thereby managing the digital data systematically.

Many users are creating digital data and systematically managing the created digital data by using online content management services such as a blog or an online social network like Cyworld™. In case a digital data to which a tag is attached is uploaded through a content management service, the digital data may be transmitted to a server for the content management service and then recorded in a database of the server. Thereafter, the recorded digital data may be used to recognize faces of persons to be included in digital data which will be uploaded in the future.

For the reasons that latest digital devices have a very many pixels, to make better quality of digital data and accordingly a file size of the digital data is on increase, there was problem: if the digital data, e.g., an image, is transmitted to the content management server, it could require a lot of memory capacity and processing time for processing the image.

In addition, there was another problem that operations were extremely increasing in order to recognize a face of a person included in a newly created digital data because it was necessary to match the face appearing in the newly created digital data with those appearing in a lot of pictures recorded in the server.

SUMMARY OF THE INVENTION

It is an object of the present invention to provide a method and a system for reducing work capacity and processing time by extracting and transmitting feature data of each part of a face such as eyes, nose, mouth, ears and jaws in order to solve the problems and recognize the face included in digital data created by a terminal.

Moreover, it is another object of the present invention to provide a method and a system for sparing the trouble of each user in updating a database because it is sufficient that each of the users merely train feature data of faces included in the digital data acquired or created by himself or herself and it is easy to share updated database including the trained feature data.

Furthermore, it is still another object of the present invention to provide a method and a system for accurately recognizing a specific face in a short time by comparing the specific face with those of persons designated as friends.

It is an object of the present invention to provide a face recognition method, including the steps of: (a) receiving feature data acquired by detecting each part of a face of a person included in digital data from a terminal at a server which is communicable with the terminal; (b) comparing the feature data received from the terminal with those of persons which are determined as accessible among all feature data recorded in a feature data database based on face recognition technology, and deciding top n persons with top n degree of similarities among all persons recorded in the feature data database at the server, wherein the feature data recorded in the feature data database include feature data of each part of faces of the persons; and (c) providing the information on the top n persons from the server to the terminal.

It is another object of the present invention to provide a face recognition method, including the steps of: (a) obtaining a face image at a server; (b) extracting feature data from the obtained face image; and (c) comparing the feature data extracted from the obtained face image with those of persons which are determined as accessible among all feature data of multiple persons recorded in a feature data database based on face recognition technology, and deciding top n persons with top n degree of similarities among all the persons recorded in the feature data database at the server.

It is still another object of the present invention to provide a method of recognizing a face by referring to a feature data database included in a server connected to a terminal through network, wherein feature data of faces of multiple persons and lists of friends including information on who have friend relationships with the multiple persons are recorded in the feature data database, including the steps of: (a) obtaining digital data inclusive of face image of a person at the terminal; (b) obtaining a particular list of friends who have friend relationships with a user of the terminal by referring to the feature data database and receiving feature data of faces of persons included in the particular list among the multiple persons included in the feature data database from the server; and (c) deciding top n persons with top n degree of similarities among the persons included in the particular list by comparing the feature data extracted from the face image in the obtained digital data with those of the persons included in the particular list received from the server.

It is still yet another object of the present invention to provide a face recognition system, including: a feature data database in which feature data of faces of multiple persons are recorded; an interface part which receives feature data acquired by detecting each part of a face of a person included in digital data inputted by a user from a terminal; a similarity calculating part which searches for persons whose feature data have degree of similarities over a predetermined threshold value by comparing the feature data received from the terminal with those recorded in the feature data database based on face recognition technology; and an access managing part which controls to search for only feature data of persons which are determined as accessible among all feature data recorded in the feature data database.

It is still yet another object of the present invention to provide a face recognition system, including: a feature data database in which feature data on faces of multiple persons are recorded; an image obtaining part which obtains a face image of a person included in an inputted digital data and extracts feature data from the obtained face image; a similarity calculating part which searches for feature data of persons who have degree of similarities over a predetermined threshold value by comparing the feature data extracted from the obtained face image with those recorded in the feature data database based on face recognition technology; and an access managing part which controls to search for only feature data of persons which are determined as accessible among all feature data recorded in the feature data database.

BRIEF DESCRIPTION OF THE DRAWINGS

The above and other objects and features of the present invention will become apparent from the following description of preferred embodiments given in conjunction with the accompanying drawings, in which:

FIG. 3 is a drawing which shows the configuration of a similarity calculating part included in the face recognition system in accordance with the present invention.

DETAILED DESCRIPTION OF THE PREFERRED EMBODIMENTS

Figure 1:
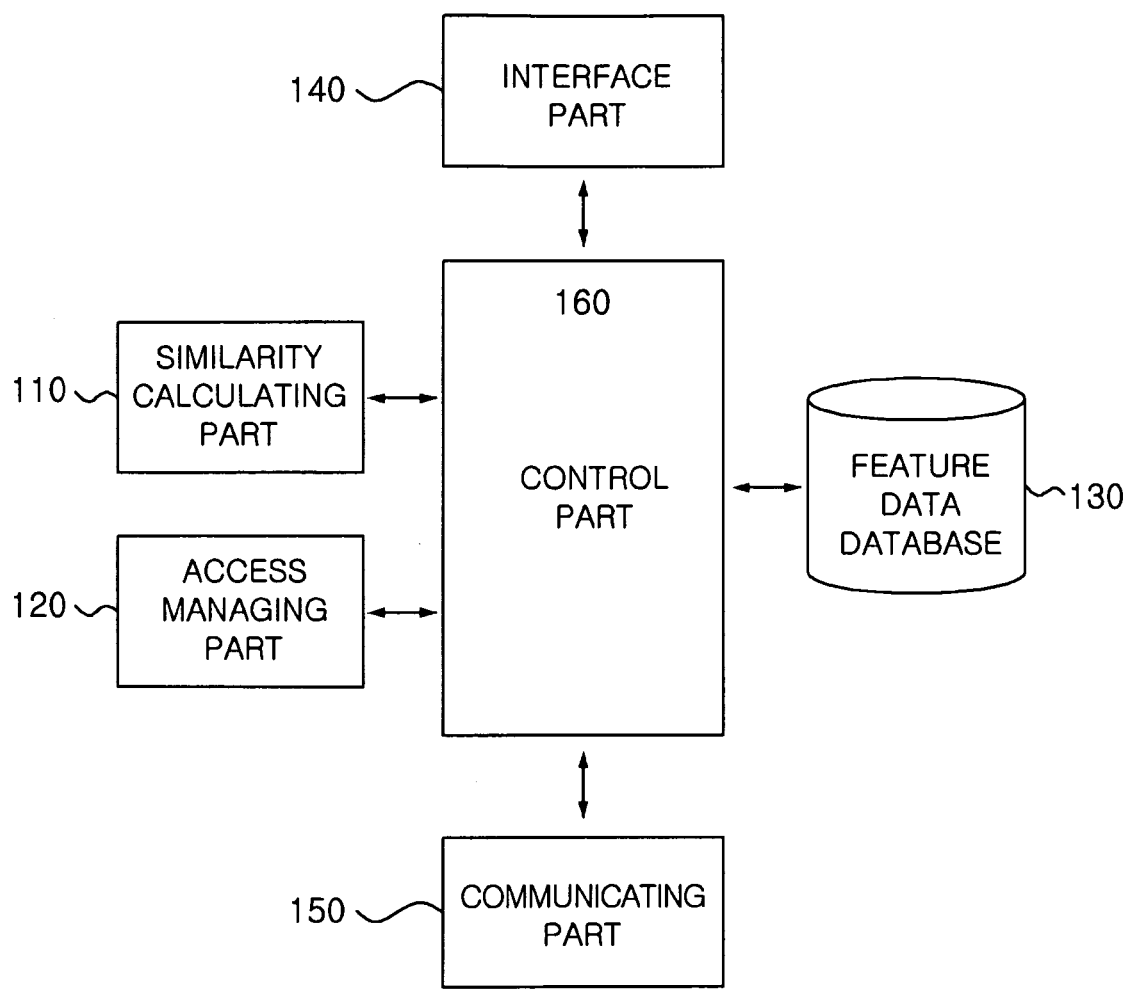
FIG. 1 is a diagram which presents the configuration of a face recognition system in accordance with the present invention.

The detailed description of the present invention illustrates specific embodiments in which the present invention can be performed with reference to the attached drawings.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The configurations of the present invention for accomplishing the objects of the present invention are as follows:

FIG. 1 is a diagram which presents the configuration of a face recognition system in accordance with an example embodiment of the present invention.

By reference to FIG. 1, the whole system 100 may include a similarity calculating part 110, an access managing part 120, a feature data database 130, an interface part 140, a communicating part 150 and a control part 160.

In accordance with an example embodiment of the present invention, at least some of the similarity calculating part 110, the access managing part 120, the feature data database 130, the interface part 140 and the communicating part 150 may be program modules which are included in a server or which communicate with the server (provided, however, that FIG. 1 illustrates that the similarity calculating part 110, the access managing part 120, the feature data database 130, the interface part 140 and the communicating part 150 are all included in the server).

The program modules may include an operating system, application program modules and other program modules and may be recorded in a plurality of well-known memory devices physically. In addition, the program modules may be recorded in remote memory devices communicable to the server. They include routines, sub-routines, programs, objects, components, data structures etc. which perform certain duties to be described below in accordance with the present invention or which practice certain types of abstract data, but they are not limited thereto.

To recognize a face of a person included in digital data, the process of comparing an image of the face inputted through a terminal with the existing images recorded in a database is required. Because the above-mentioned comparison should be made by referring to the images of each part of the faces, it is necessary to detect and get the images of each part, e.g., eyes, nose, mouth, ears, eyebrows, jaws, hair, facial contour etc., in the terminal and transmit them to the server through the interface part 140.

The technologies of detecting images of eyes, nose, mouth etc. from the images of the faces are described below.

First of all, there is an article which discloses a technology of detecting the location of eyes such as "Lucas-Kanade 20 Years On: A Unifying Framework," authored by S. Baker and one other and published in the International Journal of Computer Vision (IJCV) in 2004. The article mentions a method for effectively detecting the location of eyes from images of faces by using the template matching scheme. Of course, it is not limited to this and various examples may be adopted to detect the location of eyes.

Based on the location of eyes detected by the technology, it is possible to estimate the location of the nose, mouth etc. and it is possible to extract the feature data of each part of the face, e.g., eyes, nose and mouth, from each estimated location and then transmit them to the system 100.

Herein, to search for the location of each part of the face, the technology such as "Linear Discriminant Analysis" disclosed in "Eigenfaces vs. Fisherfaces: Recognition Using Class Specific Linear Projection," a paper authorized by P. N. Belhumeur and two others published in IEEE TRANSACTIONS ON PATTERN ALAYSIS AND MACHINE INTELLIGENCE in 1997 may be adopted. Of course, it is not limited to this and various examples may also be adopted.

The similarity calculating part 110 may search for a person with a higher degree of similarity by comparing the extracted feature data transmitted from the terminal with the existing images regarding eyes, nose, mouth etc. included in the feature data database 130.

In short, the similarity calculating part 110 enumerates degree of similarities by comparing the feature data of each part of the face transmitted from the terminal with those of faces recorded in the feature data database 130 and plays a role in screening top n persons out, and therefore, the accuracy of face recognition becomes higher. This will be explained in detail by reference to FIG. 3.

When the similarity calculating part 110 compares the feature data of each part of the face remitted from the terminal with those of the faces recorded in the feature data database 130, the access managing part 120 may allow to access only feature data on persons designated as friends of the user of the terminal among all the feature data recorded in the feature data database 130. The friend relationship may refer to, for example, the relationship registered in the user's messenger address book, neighborhood relationship with the user, the relationship registered in the user's telephone book or the like and such a friend relationship may be decided uniquely by each user.

Accordingly, the subjects of the feature data to which the similarity calculating part 110 is accessible are compressed only to the feature data of the persons designated as the user's friends by the access managing part 120. In general, considering that a user is likely to take photos of persons who have high degree of familiarities with himself or herself, it is possible to extremely increase the face recognition rate by allowing to access only to the feature data on the persons with the high degree of familiarities.

As such, it is possible to refer to the information on whose feature data are accessible according to the identity of each user. Herein, the information may exist in a form of database (not shown) in the access managing part 120 and also may be included in the feature data database 130 to be explained below as another example.

A variety of databases include databases not only in a narrow meaning but also in a wide meaning such as data records based on file systems and a simple set of logs if data can be extracted therefrom. The feature data database 130 may be included in the system 100 but it may exist in a remote memory device communicable to the system 100.

Specifically, in accordance with an example embodiment of the present invention, the feature data database 130 may include the feature data on each part of the faces of multiple persons.

Figure 2:
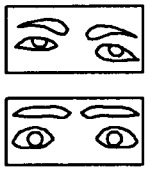
FIG. 2 is a drawing which exemplarily illustrates the structure of a database on feature data included in the face recognition system in accordance with the present invention.
Figure 2:
Figure 2:
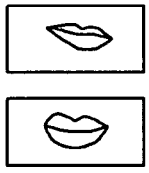
Figure 2:
Figure 2:
Figure 2:
Figure 2:
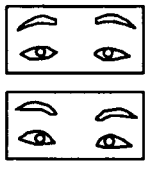
Figure 2:
Figure 2:
Figure 2:
Figure 2:
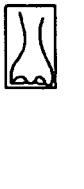

FIG. 2 is an example of the structure of the feature data database 130. By reference to FIG. 2, it may be found that the images on each part, e.g., eyes, nose, mouth etc., of the faces of users having their own IDs such as "dongle," and "Tom" are recorded in the feature data database 130 and it would be easy to obtain the feature data on each part from the images.

If a user with the ID "dongle" accesses the system 100 through the user interface provided by the interface part 140 and uploads a digital data created by using a digital device such as digital camera and camcorder through a template provided by the interface part 140, the feature data detected and obtained from each part of the faces of the persons included in the uploaded digital data may be transmitted to the system 100 through the interface part 140.

By reference to an example of the internal structure of the feature data database 130 in FIG. 2, it may be found that a user with the ID "Tom" is registered in the list of friends of the user with the ID called "dongle" and users with their IDs "dongle" and "Jane" are registered in the list of friends of the user with the ID called "Tom". Accordingly, if the user with the ID "dongle" access to the system 100, the access managing part 120 may grant to "dongle" the right of accessing to only the feature data on himself/herself and "Tom" by referring to the list of friends, i.e., "Tom", of "dongle".

As such, since only the feature data of friends are accessible, the matching speed may remarkably increase and the recognition rate may become higher.

The interface part 140 receives the feature data of each part of the faces extracted from the digital data created by the terminal as mentioned above and performs the function to receive the user ID from the terminal. Then, the received feature data to be used to calculate the degree of similarities are transmitted to the similarity calculating part 110 under the supervision of the control part 160 and the received user ID is transmitted to the access managing part 120 under the control part 160 to get the information on the feature data of the persons designated as friends of the user ID (recorded in the feature data database 130).

Furthermore, the interface part 140 may allow the user to select a particular person in a top n list in which candidate persons with the top n highest degree of similarities are included, wherein the top n list is displayed through a screen of the terminal. If it is fed back by the user that there is no appropriate person in the top n list, it is possible to perform a function to display the next top n list including the information on candidate persons with the next top n highest similarities.

If a particular person among the top n list is selected by the user, the identity of the person included in digital data created by the terminal may be determined as the particular person and the person tag related to the "particular person" may be granted to the created digital data.

In addition, the interface part 140 may receive the information on the particular person from the terminal and additionally record it in the feature data database 130 to show that the feature data of the person included in the created digital data belong to the particular person.

As such, the user will train (or feed back) the feature data of the person included in the digital data acquired or created by himself or herself by deciding the identity of the person included in the created digital data. Similarly, the other user may train the feature data of persons included in digital data acquired or created by himself or herself. As such, if each user trains the digital data acquired or created by himself or herself, the update speed will incredibly increase on the feature data database 130. Thus, it has the effects to extremely improve the face recognition rate and help the users to save their troubles by sharing the frequently updated database 130.

In accordance with the present invention, the control part 160 performs a function to control the data flow among the similarity calculating part 110, the access managing part 120, the feature data database 130, the interface part 140 and the communicating part 150. In other words, the control part 160 in accordance with the present invention controls the signals received or transmitted between the constitution modules through the communicating part 150 to thereby make them (i.e., the similarity calculating part 110, the access managing part 120, the feature data database 130 and the interface part 140) perform their unique functions.

FIG. 3 is a drawing which shows the internal configuration of the similarity calculating part 110 in detail. By reference to FIG. 3, the similarity calculating part 110 includes a similarity score calculating part 110A, a weighted value application part 110B, a total score calculating part 110C and a top n list providing part 110D.

The similarity score calculating part 110A performs a function to calculate a degree of similarity of each part by comparing the feature data of each part of the face received from the terminal to those recorded in the database 130.

For example, if the feature data of the eyes are received from the terminal, they will be matched by referring to the feature data of eyes in the feature data database 130 and thus a degree of similarity of the eye will be calculated. Herein, the feature data on a width and a height of each eyelid, a length of a brow, a width and a length of each eyebrow and a shape and a location of each eyebrow will be referred to.

Besides, if the feature data of the nose is received from the terminal, they will be matched by referring to the feature data of nose in the feature data database 130 and thus a degree of similarity of the nose will be calculated. Herein, feature data such as a height and a width of the nose, a shape of the ridge of the nose and the nostril would be referred to.

In case of the ears, the feature data including a diameter and a height of each ear would be referred to; while in case of the mouth, the feature data including a width and a height of the mouth, a thickness of the lip and a shape of the lip in smiling would be referred to.

As such, in order to calculate total scores by summing up similarity scores of each part, the similarity calculating part 110 may include the weighted value application part 110B.

The weighted value application part 110B may apply a different weighted value to each of the parts. If a score of a particular part acts as a more important factor in increasing the face recognition rate, it may increase the weighted value of the particular part. The weighted value may be variously changed according to conditions under which images of persons are created, identities of the persons who appear in the images and a feedback of the user etc.

The total score calculating part 110C may calculate the total scores by summing up weighted scores for each part of the faces, the respective weighted scores being calculated by multiplying the respective weighted values by the respective similarity scores of the respective parts. The person who gets a higher total score would have a higher possibility of being determined to be a person included in the created digital data. If there are n parts in a face and the respective weighted values corresponding to the n parts are the first, the second, . . . , the n-th weighted value, the calculation of the total scores would be made by the following formula:

Total Scores=(the first weighted value*the similarity score of the first part+the second weighted value*the similarity score of the second part+ . . . +the $n$-th weighted value*the similarity score of the $n$-th part).

The top n list providing part 110D may display the top n list which includes persons who have top n total scores among the persons recorded in the feature data database 130 through the interface part 140. If the user may select a particular person included in the top n list through the interface part 140, the identity of the person included in the created digital data is determined as the particular person with ease.

Thereafter, if the particular candidate person is selected by the user, the information on the particular candidate person may be attached to the created digital data as a tag. In addition, the weighted value application part 110B may increase a particular weighted value allotted to a particular similarity score of a particular part of the face of the particular candidate person, wherein the particular similarity score is the highest one among all the similarity scores which the particular candidate person keeps. In brief, this invention, has the gist to increase the weighted value corresponding to the particular part judged as the most influential part in achieving the highest total scores by receiving the feedback of the user and would increase the face recognition rate in the future if the adjusted weighted value is used. As such, it is possible to implement the face recognition device capable of keeping evolving by using the feedback of the user.

As explained above, the similarity calculating part 110 was described in such a manner that it calculates the degree of similarities by summing up the respective similarity scores, but another method is allowable as well. For example, it is sure that the feature data of the whole face can be extracted and then the degree of similarities are determined by comparing the extracted feature data with those of the whole face recorded in the feature data database 130.

Moreover, the example of extracting the feature data in the terminal and then transmitting the extracted feature data to the server was explained above, but it is not confined thereto. As another example, it is possible that the server may get an image itself. In detail, the server may get the face image itself from the terminal or from the photos recorded in personal media including online social networks such as Cyworld™, Blog™, Facebook™ and Myspace™, or from the images registered in other web services such as news posts.

Even in the case, the degree of similarities would be determined in the same way by extracting the feature data from the images themselves. Of course, even at the time, the face recognition rate would be considerably increased by allowing to access to the feature data of specific persons who have friend relationships with the user among all the feature data recorded in the feature data database 130 while the degree of similarities are calculated.

On the other hand, in accordance with another example embodiment of the present invention, when the face of the person included in the digital data obtained by the terminal are recognized, it would be possible to recognize the face of the person by receiving only the feature data on the persons included in the list of friends from the server through the network.

In particular, if the terminal gets the digital data inclusive of the face image of the person, it gets a particular list of friends including information on the persons who have friend relationships with the user from the feature data database 130 in the server and it is possible to select and receive from the server only feature data on the persons included in the particular list of friends among all the feature data included in the feature data database 130. Accordingly, it would be possible to perform matching tasks not in the server but in the terminal.

In accordance with the present invention as shown above, in light of the fact that feature data of each part of a face, e.g., eyes, nose, mouth and ears, appearing in the digital data created by the terminal is extracted and transmitted to the server, it has the effect to reduce the work capacity and the processing time.

In addition, since it is enough for each of the users to merely train feature data of faces included in the digital data acquired or created by himself or herself and it is easy to share updated database including the trained feature data, it has the effects to extremely improve the face recognition rate and save the users' troubles in updating the database.

Moreover, it has the effect to recognize a face with a high accuracy within a shorter time because a face in a digital data newly inputted by a user is compared with persons who have high degree of familiarities with the user.

The embodiments of the present invention can be implemented in a form of executable program command through a variety of computer means recordable to computer readable media. The computer readable media may include solely or in combination, program commands, data files and data structures. The program commands recorded to the media may be components specially designed for the present invention or may be usable to a skilled person in a field of computer software. Computer readable record-media include magnetic media such as hard disk, floppy disk, magnetic tape, optical media such as CD-ROM and DVD, magneto-optical media such as floptical disk and hardware devices such as ROM, RAM and flash memory specially designed to store and carry out programs. Program commands include not only a machine language code made by a complier but also a high level code that can be used by an interpreter etc., which is executed by a computer. The aforementioned hardware device can work as more than a software module to perform the action of the present invention and they can do the same in the opposite case.

While the invention has been shown and described with respect to the preferred embodiments, it will be understood by those skilled in the art that various changes and modification may be made without departing from the spirit and scope of the invention as defined in the following claims.

Accordingly, the thought of the present invention must not be confined to the explained embodiments, and the following patent claims as well as everything including variations equal or equivalent to the patent claims pertain to the category of the thought of the present invention.

What is claimed is:

1. A face recognition method, comprising the steps of:
(a) creating a list of persons determined uniquely based on a user of a terminal, said persons on said list comprising a subset of people for which information is stored in a feature data database on a server, where said information includes feature information for said persons;
(b) receiving feature data at a server from a the terminal which is communicable with the server, said feature data acquired by detecting each part of a face of a person included in digital data;
(c) comparing the feature data received from the terminal with feature data stored in said feature data database of said persons on said list of persons based on face recognition technology, and deciding top n persons with top n degree of similarities among the persons on said list of persons by referring to respective similarity scores of each part of the face and total scores reflecting a weighted value allotted to each part of the face to the degree of similarities that is changed based on an identity of the person, wherein comparing the feature data comprises calculating a first degree of similarity between a first facial part of the received feature data and a first corresponding feature data stored in the feature database, calculating a second degree of similarity between a second facial part of the received feature data and a second corresponding feature data stored in the feature database, and adding the first degree of similarity and the second degree of similarity; and
(d) providing the information on the top n persons from the server to the terminal.

2. The method of claim 1, wherein the persons on said list include persons who are included in the user's messenger address book, persons who have neighborhood relationships with the user, and the persons who are registered in the user's telephone book.

3. The method of claim 2, wherein the feature data include data associated with at least one of the parts of the faces of the persons, wherein the parts include eyes, nose, mouth, ears, eyebrows, jaws, hair or facial contour.

4. The method of claim 1, further comprising the step of:
(d) attaching at least one tag to the digital data by using information on a particular person if the particular person is selected by the user among the top n persons.

5. The method of claim 4, wherein, if the particular person is selected at the step (d), the feature data received from the terminal is additionally recorded in relation to the particular person in the feature data database.

6. The method of claim 1, wherein, at the step (b), the feature data received from the terminal are extracted from the whole faces and the degree of similarities are determined by comparing the feature data extracted from the whole faces with those of the whole faces recorded in the feature data database.

7. A face recognition method, comprising the steps of:
(a) obtaining a face image at a server;
(b) extracting feature data from the obtained face image of a person; and
(c) comparing the feature data extracted from the obtained face image with those of persons on a list of persons determined uniquely based on a user of a terminal, said persons on said list comprising a subset of people for which information is stored in a feature data database on a server, where said information includes feature information for said persons based on face recognition technology, and deciding top n persons with top n degree of similarities among the persons on said list of persons by referring to respective similarity scores of each part of the face and total scores reflecting a weighted value allotted to each part of the face to the degree of similarities that is changed based on an identity of the person, wherein comparing the feature data comprises calculating a first degree of similarity between a first facial part of the received feature data and a first corresponding feature data stored in the feature database, calculating a second degree of similarity between a second facial part of the received feature data and a second corresponding feature data stored in the feature database, and adding the first degree of similarity and the second degree of similarity.

8. The method of claim 7, wherein, at the step (a), the server receives the face image from the terminal through network.

9. The method of claim 7, wherein, at the step (a), the server obtains the face image from contents recorded in one personal media or registered in other internet services.

10. A method of recognizing a face by referring to a feature data database included in a server connected to a terminal through network, wherein feature data of faces of multiple persons and lists of friends including information on who have friend relationships with the multiple persons are recorded in the feature data database, comprising the steps of:
(a) obtaining digital data inclusive of face image of a person at the terminal;
(b) obtaining a particular list of friends who have friend relationships with a user of the terminal by referring to the feature data database and receiving feature data of faces of persons included in the particular list from the server, said persons on said particular list being a subset of all the persons included in the feature data database; and
(c) deciding top n persons with top n degree of similarities among the persons included in the particular list by comparing the feature data extracted from the face image in the obtained digital data with those of the persons included in the particular list received from the server decided by referring to respective similarity scores of each part of the face and total scores reflecting a weighted value allotted to each part of the face to the degree of similarities that is changed based on an identity of the person, wherein comparing the feature data comprises calculating a first degree of similarity between a first facial part of the received feature data and a first corresponding feature data stored in the feature database, calculating a second degree of similarity between a second facial part of the received feature data and a second corresponding feature data stored in the feature database, and adding the first degree of similarity and the second degree of similarity.

11. The method of claim 10, wherein the particular list include persons who are included in the user's messenger address book, persons who have neighborhood relationships with the user, and persons who are registered in the user's telephone book.

12. The method of claim 11, wherein, at the step (c), the feature data are extracted on the whole face of the person included in the obtained digital data.

13. The method of claim 12, wherein the feature data database includes a first feature data database in which the feature data of the faces of the multiple persons are recorded and a second feature data database in which the lists of friends including information on who have friend relationships with the multiple persons are recorded.

14. A face recognition system, comprising:
a feature data database in which feature data of faces of multiple persons are recorded determined uniquely based on a user of a terminal;
an interface part which receives feature data acquired by detecting each part of a face of a person included in digital data inputted by a user from a terminal;
a similarity calculating part which searches for persons whose feature data have degree of similarities over a predetermined threshold value by comparing the feature data received from the terminal with those of persons on a list of persons decided by referring to respective similarity scores of each part of the face and total scores reflecting a weighted value allotted to each part of the face to the degree of similarities that is changed based on an identity of the person, where said persons on said list comprise a subset of people for which information is recorded in the feature data database based on face recognition technology, wherein comparing the feature data comprises calculating a first degree of similarity between a first facial part of the received feature data and a first corresponding feature data stored in the feature database, calculating a second degree of similarity between a second facial part of the received feature data and a second corresponding feature data stored in the feature database, and adding the first degree of similarity and the second degree of similarity; and
an access managing part which controls to search for only feature data of persons which are included on said list of persons.

15. The system of claim 14, wherein the interface part provides information on top n persons with top n degree of similarities from a server to the terminal.

16. The system of claim 14, wherein the feature data include data associated with at least one of the parts of the faces of the persons, wherein the parts include eyes, nose, mouth, ears, eyebrows, jaws, hair of facial contour.

17. The system of claim 14, wherein, if a particular person is selected among the top n persons by the interface part, the feature data received from the terminal are additionally recorded with respect to the particular person.

18. A face recognition system, comprising:
a feature data database in which feature data on faces of multiple persons are recorded;
an image obtaining part which obtains a face image of a person included in an inputted digital data and extracts feature data from the obtained face image;
a similarity calculating part which searches for feature data of persons who have degree of similarities over a predetermined threshold value by comparing the feature data extracted from the obtained face image with those of persons on a list of persons decided by referring to respective similarity scores of each part of the face and total scores reflecting a weighted value allotted to each part of the face to the degree of similarities that is changed based on an identity of the person, where said persons on said list comprise a subset of people for which information is recorded in the feature data database based on face recognition technology, wherein comparing the feature data comprises calculating a first degree of similarity between a first facial part of the received feature data and a first corresponding feature data stored in the feature database, calculating a second degree of similarity between a second facial part of the received feature data and a second corresponding feature data stored in the feature database, and adding the first degree of similarity and the second degree of similarity; and
an access managing part which controls to search for only feature data of persons which are included on said list of persons,
wherein the persons on said list are determined uniquely based on a user of terminal.

19. One or more non-transitory computer-readable media having stored thereon a computer program that, when executed by one or more processors, causes the one or more processors to perform acts including:
receiving a list of persons authorized by a user, said persons on said list comprising a subset of people for which information is stored in feature data database on a server, where said information includes feature information for said persons;
receiving feature data at a server from a terminal which is communicable with the server, said feature data acquired by detecting each part of a face of a person included in digital data;
comparing the feature data received from the terminal with feature data stored in said feature data database of said persons on said list of persons based on face recognition technology, and deciding top n persons with top n degree of similarities among the persons on said list of persons by referring to respective similarity scores of each part of the face and total scores reflecting a weighted value allotted to each part of the face to the degree of similarities that is changed based on an identity of the person, wherein the feature data recorded in the feature data database include feature data of each part of faces of the persons, wherein comparing the feature data comprises calculating a first degree of similarity between a first facial part of the received feature data and a first corresponding feature data stored in the feature database, calculating a second degree of similarity between a second facial part of the received feature data and a second corresponding feature data stored in the feature database, and adding the first degree of similarity and the second degree of similarity; and
providing the information on the top n persons from the server to the terminal.

* * * * *